United States Patent
Woods (10) Patent No.: US 11,442,830 B2
(45) Date of Patent: Sep. 13, 2022

(54) ESTABLISHING AND MONITORING PROGRAMMING ENVIRONMENTS

(71) Applicant: Target Brands, Inc., Minneapolis, MN (US)

(72) Inventor: Daniel Woods, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/407,823

(22) Filed: Aug. 20, 2021

(65) Prior Publication Data

US 2021/0382802 A1    Dec. 9, 2021

Related U.S. Application Data (62) Division of application No. 15/909,615, filed on Mar. 1, 2018, now Pat. No. 11,132,274.

(51) Int. Cl.
*G06F 11/30* (2006.01)
*G06F 9/445* (2018.01)

(52) U.S. Cl.
CPC ...... *G06F 11/3006* (2013.01); *G06F 9/44594* (2013.01); *G06F 11/3055* (2013.01)

(58) Field of Classification Search
CPC ............. G06F 11/3006; G06F 9/44594; G06F 11/3055; G06F 8/36; G06F 8/60; G06F 9/455; G06F 8/41
See application file for complete search history.

(56) References Cited

U.S. PATENT DOCUMENTS

| | | | |
|---|---|---|---|
| 7,292,990 B2 | 11/2007 | Hughes | |
| 7,519,964 B1 | 4/2009 | Islam et al. | |
| 7,730,123 B1 | 6/2010 | Erickson et al. | |
| 7,793,113 B2 | 9/2010 | Bhogal et al. | |
| 8,028,299 B2 | 9/2011 | Holt | |
| 8,276,167 B2 | 9/2012 | Challenger et al. | |
| 9,383,992 B2 | 7/2016 | Nigul | |
| 9,665,079 B2 | 5/2017 | Heine et al. | |
| 2001/0049286 A1 | 12/2001 | Hansmann et al. | |
| 2003/0110482 A1 | 6/2003 | Ferguson et al. | |
| 2006/0161909 A1* | 7/2006 | Pandey | G06F 8/60 717/120 |

(Continued)

OTHER PUBLICATIONS

Ashraf et al., Prediction-based VM provisioning and admission control for multi-tier web applications, Journal of Cloud Computing: Advances, Systems and Applications, vol. 5, No. 15, 21 pages, 2016.

(Continued)

*Primary Examiner* — Javier O Guzman
(74) *Attorney, Agent, or Firm* — Theodore M. Magee; Westman, Champlin & Koehler, P.A.

(57) ABSTRACT

A computer-implemented method includes receiving at a computer a request for a metric describing an execution of an application on the computer and sending from the computer a respective request for the metric to each of a plurality of computing machines. Responses are received at the computer from the plurality of computing machines and are used to send from the computer a response to the request for the metric that was received at the computer.

20 Claims, 9 Drawing Sheets

(56) References Cited

U.S. PATENT DOCUMENTS

| | | | |
|---|---|---|---|
| 2008/0148253 A1* | 6/2008 | Badwe | G06F 21/10 |
| | | | 717/174 |
| 2009/0119662 A1* | 5/2009 | Fangmeier | G06F 8/60 |
| | | | 717/176 |
| 2010/0262590 A1 | 10/2010 | Holt | |
| 2014/0053145 A1 | 2/2014 | Steigleder | |
| 2015/0355893 A1* | 12/2015 | Luk | G06F 21/60 |
| | | | 717/178 |
| 2016/0246586 A1 | 8/2016 | Madanapalli et al. | |
| 2017/0111241 A1 | 4/2017 | Degioanni | |
| 2017/0126432 A1 | 5/2017 | Padala et al. | |
| 2019/0272224 A1 | 9/2019 | Woods | |
| 2020/0394025 A1* | 12/2020 | Mindus | G06F 3/147 |

OTHER PUBLICATIONS

Puppet.com, Managing Environment with a control repository, https://puppet.com/docs/pe/2017.1/cmgmt_control_repo.html, 5 page, 2017.

Managing and Deploying Puppet Code, https://puppet.com/docs/pe/2017.3/code_management/control_repo.html, Managing environments with a control repository, 3 pages, 2017.

Puppet Enterprise Architecture, https://puppet.com/docs/pe/2017.3/overview/~pe_architecture_overview.html, 12 pages, 2017.

Prosecution history of corresponding U.S. Appl. No. 15/909,615 including: Notice of Allowance dated May 27, 2021, Response After Final dated Dec. 7, 2020, Final Rejection dated Oct. 9, 2020, Applicant Initiated Interview summary dated Jul. 14, 2020, Amendment dated Jul. 2, 2020 and Office Action dated Apr. 3, 2020.

* cited by examiner

ESTABLISHING AND MONITORING PROGRAMMING ENVIRONMENTS

CROSS-REFERENCE TO RELATED APPLICATION

The present application is a divisional of and claims priority of U.S. patent application Ser. No. 15/909,615, filed Mar. 1, 2018, the content of which is hereby incorporated by reference in its entirety.

BACKGROUND

Large corporations and institutions have huge numbers of machines operating software including various computers, mobile devices, and equipment controllers. Each of these computing devices in turn contains a number of programs or applications. Making sure that each computing machine has the most current version of the applications running and that the machine is not running undesirable applications is a daunting and error prone task. In particular, it is difficult to manually keep track of which applications are to be running on which machines and to constantly survey machines to ensure that they are running the correct applications. As a result, large numbers of machines in corporations are running incomplete or incorrect collections of applications and therefore the computing system as a whole is not operating as desired.

The discussion above is merely provided for general background information and is not intended to be used as an aid in determining the scope of the claimed subject matter. The claimed subject matter is not limited to implementations that solve any or all disadvantages noted in the background.

SUMMARY

A machine includes a memory and a processor performing steps. The steps include receiving at the processor a request for a metric describing an execution of an application on the processor. A respective request for the metric is sent from the processor to each of a plurality of computing machines. Responses from the plurality of computing machines are received at the processor and are used to send from the processor a response to the request for the metric that was received at the processor.

In a further embodiment, a computer-implemented method includes receiving a request at a computer for a metric associated with execution of an application. A respective request for the metric is then sent to each of a plurality of computing machines that are executing the application. Respective responses are received from each of the plurality of computing machines and are used to create and send a response to request for the metric wherein the response makes it appear that the application is being executed by the computer instead of by the plurality of computing machines.

In a still further embodiment, a computer-implemented method includes receiving at a computer a request for a metric describing an execution of an application on the computer and sending from the computer a respective request for the metric to each of a plurality of computing machines. Responses are received at the computer from the plurality of computing machines and are used to send from the computer a response to the request for the metric that was received at the computer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the various embodiments described below, machines are assigned to computing/programming environments where a computing environment consists of a collection of software applications. When an application coder builds a new application, they assign the application to one or more environments and designate a number of instances that machines assigned to the designated environment should run. For each designated environment, an instruction is sent to a middle layer server to load the designated number of instances of the application on the middle layer server. Instead of loading the instances on the middle layer server, the middle layer server writes a specification for the application to a code list repository designated for the environment. The specification includes the name of the application, the version of the application, the number of instances of the application that should be run, and the location of a build repository containing an executable version of the application.

Machines periodically check which environment they are assigned to and based on their assigned environment, request all of the specifications stored in the code list repository for that environment. The machines then compare the specifications in the code list to the applications currently loaded in memory in the machine. If a specification for an application is present in the code list that is not loaded in the machine, the machine uses the path to the executable version of the application to retrieve the executable version of the application and load it into memory. If the machine is running an application that does not have a specification in the code list, the machine removes the application from memory. The machine also ensures that the number of instances of each application loaded in memory in the machine matches the number of instances designated in the specifications from the code list repository.

The middle layer is also capable of receiving instructions to remove an application from the middle layer server. In response to such instructions, the middle layer removes the specification for that application from the code list repository for the environment.

In further embodiments, the middle layer can be used to monitor the health of application instances running on all machines assigned to an environment. In particular, in response to receiving a request for the health of all instances of an application that are expected to be running on the middle layer server for a particular environment, the middle layer sends a request to each machine in the environment to obtain the status/health metrics of each instance of the application running on those machines. After receiving the status of each application instance from each of the machines assigned to the environment, the middle layer aggregates the status information/metrics to provide a single status response to the requestor.

Figure 1:
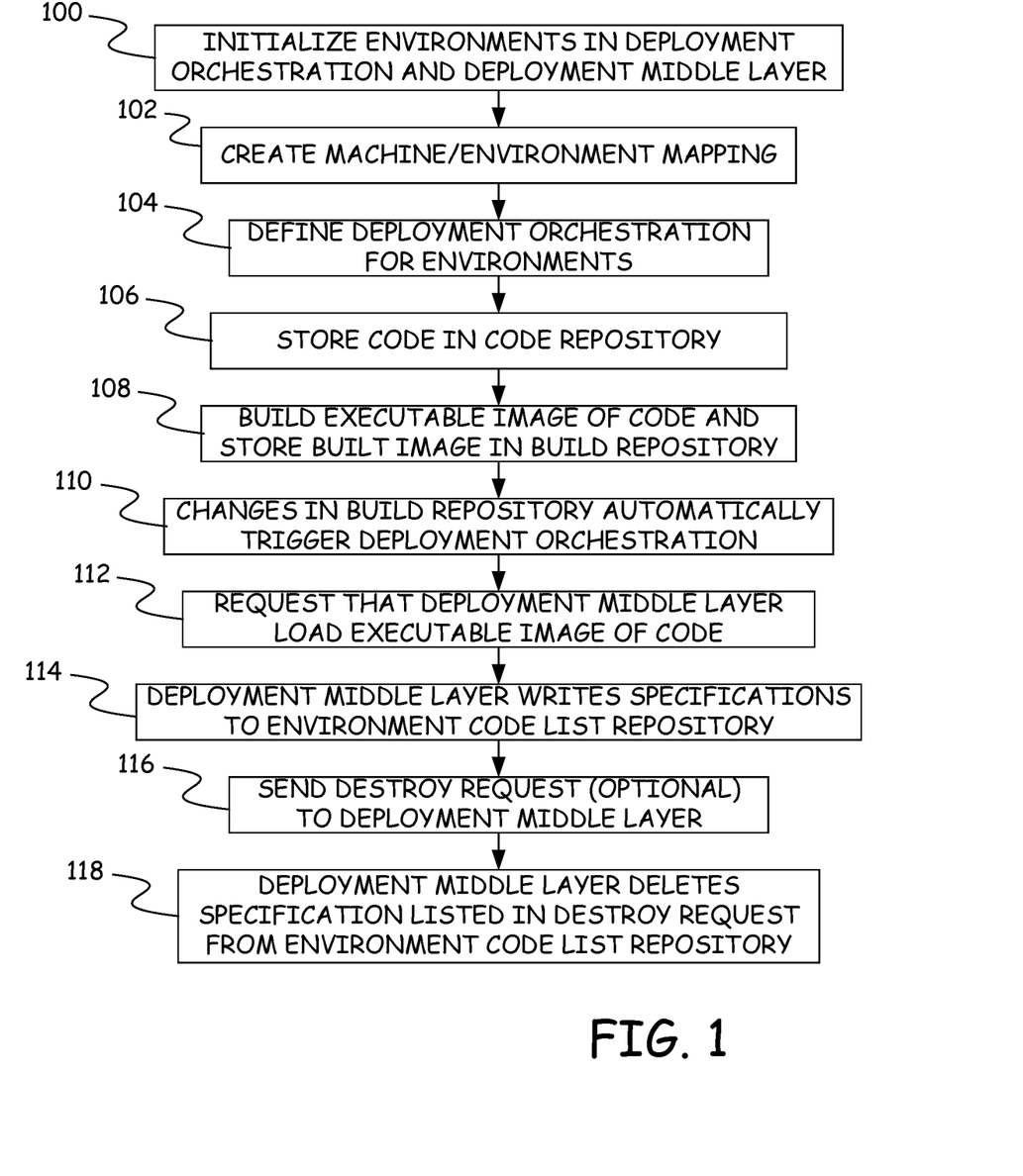
FIG. 1 is flow diagram of a method of generating environment code lists in accordance with one embodiment.
Figure 2:
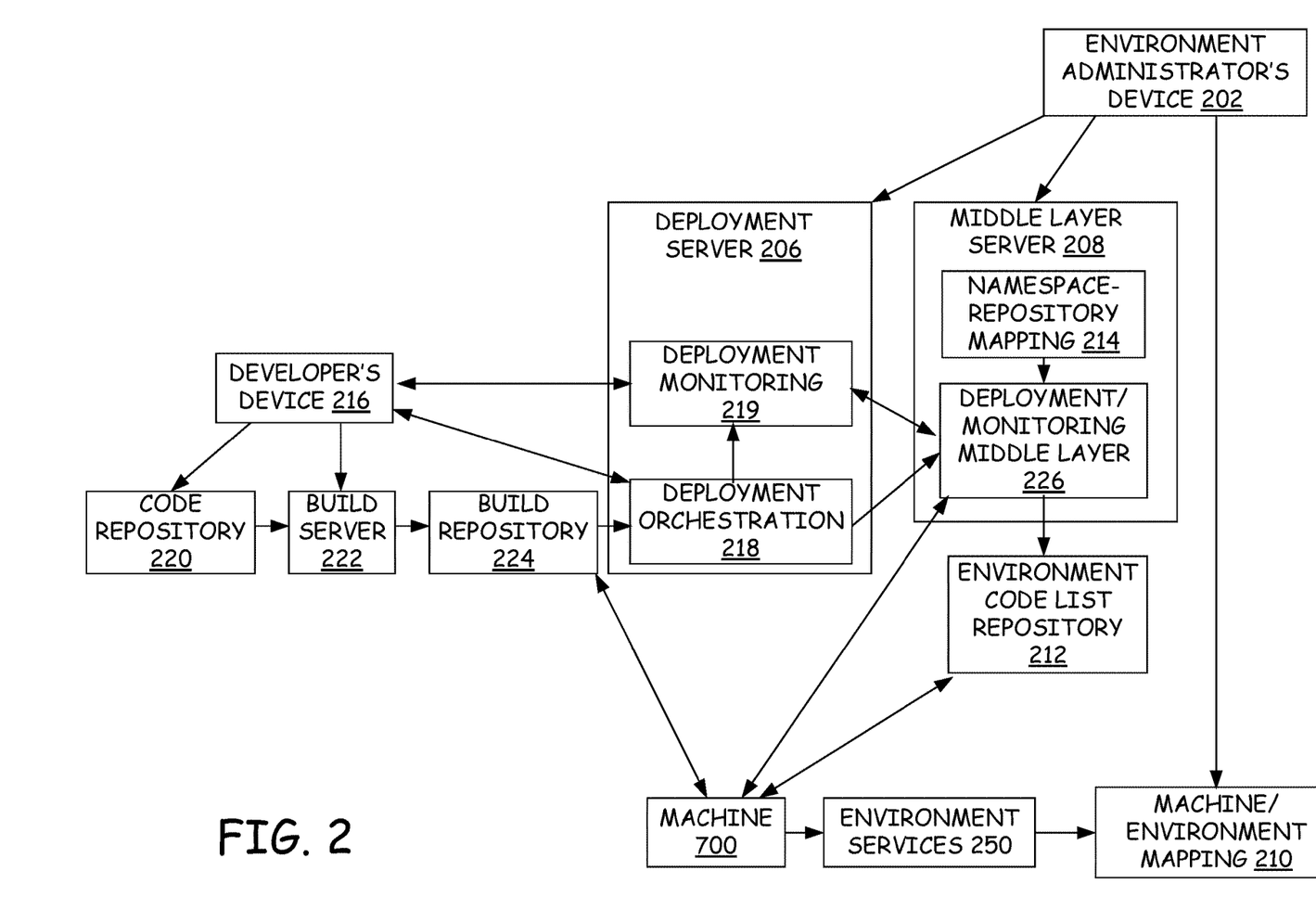
FIG. 2 is a block diagram of a system for updating and monitoring the software on machines in accordance with one embodiment

FIG. 1 provides a flow diagram of a method of deploying applications and FIG. 2 provides a block diagram of a system for deploying and monitoring applications in accordance with one embodiment. In step 100 of FIG. 1, an environment administrator's device 202 is used to initialize computing/programming environments, where a computing/programming environment is a dynamic collection of applications that can change over time. The terms computing environment, programming environment and environment are used interchangeable and are to be considered to have the same meaning.

In accordance with one embodiment, initializing an environment involves creating an environment code list repository 212 for the environment and a namespace for the environment. The environment code list repository is a storage area that can be located in any desired server or can be distributed across several servers and can be accessed using a path that describes where the storage area is located in a network. The namespace is then mapped to the path of the environment code list repository and the mapping is stored in a namespace-to-repository mapping 214 of a middle layer server 208. In addition, the namespace for each environment is stored in a deployment server 206 so that it can be selected during the formation of deployments.

Figure 3:
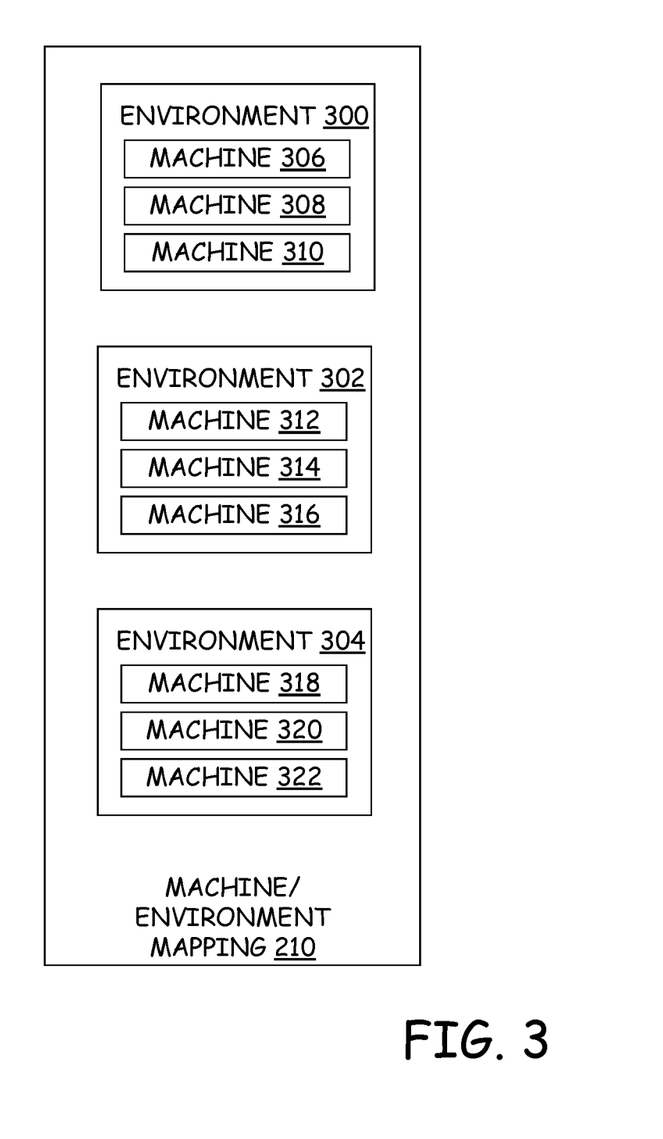
FIG. 3 is an example of a machine/environment mapping in accordance with one embodiment.

At step 102, a machine/environment mapping 210 is created that assigns each machine in the system to a computing environment. FIG. 3 provides an example of machine/environment mapping 210 showing three environments 300, 302 and 304 where environment 300 has machines 306, 308 and 310 assigned to it, environment 302 has machines 312, 314 and 316 assigned to it and environment 304 has machines 318, 320 and 322 assigned to it. Although only three environments with three machines each are shown in FIG. 3, in other embodiments, any number of environments can be provided with any number of machines assigned to each environment. Note that the machines are not physically placed in a same physical environment but instead are assigned to a same programming environment such that all of the machines are expected to execute the same collection of applications including the same number of instances of each application.

At step 104, a code developer uses a developer's device 216, which in one embodiment is a computing device, to define a deployment orchestration using a deployment orchestration module 218. The deployment orchestration includes an indication of how a deployment is to be triggered for each environment, the namespace to use for deployments associated with an environment and whether to delete/remove previous versions of an application when deploying a new version of the application to the environment. In addition, deployment orchestrations can be defined for environments to remove existing applications from an environment without including instructions to add applications to the environment.

At step 106, the code developer uses developer's device 216 to store source code for an application in a code repository 220 and in step 108 instructs a build server 222 to build and store an executable image/form of the code in a build repository 224. In accordance with one embodiment, the executable image is a container that contains the application and any binary or library dependencies of that application. In such embodiments, such containers can be executed so that they have their own file system, memory partition and IP address. Although containers are used on one embodiment, other executable images are built in other embodiments.

At step 110, the change in build repository 224 caused by storing the executable image triggers a deployment orchestration 218 associated with one or more environments. In step 112, triggered deployment orchestration 218 sends a request to deployment middle layer 226 on deployment middle layer server 208 to have instances of the executable image loaded into the memory of middle layer server 208. In one embodiment, this request takes the form of an application collection API call such as a Docker API call, a Docker Swarm API call, a Kubernetes API call, or a Nomad API call, for example. The request includes a specification that contains the name of the application, the version of the application, the number of instances to be loaded into memory and a path to the executable image in build repository 224. In accordance with one embodiment, the specification provides parameters for a Kubernetes ReplicaSet. In addition, an identifier of the namespace associated with the environment is provided as part of a parameter passed with the request and/or is included in the specification.

At step 114, deployment/monitoring middle layer 226 receives the specification and the request to load the executable form of the application and in response writes the specification to the environment code list repository 212 associated with the environment. In particular, deployment/monitoring middle layer 226 parses the specification or the parameters passed with the request to identify the namespace of the specification and then uses the namespace to retrieve the path to the environment's code list repository 212 from namespace-to-repository mapping 214. Deployment/monitoring middle layer 226 then stores the specification at the location designated by the retrieved path.

At step 116, deployment orchestration 218 sends an optional request for deployment/monitoring middle layer 226 to remove an executable image from the memory of middle layer server 208. For example, the request can be to remove an earlier version of the application that deployment orchestration 218 just requested deployment/monitoring middle layer 226 to load into memory. The request to remove the executable image includes an identification of the application and version that is to be destroyed and the namespace of the environment that the application has been assigned to.

Based on the request to remove the executable image from memory, deployment/monitoring middle layer 226 removes the specification associated with the executable image from the environments code list repository 212 at step 118. In accordance with one embodiment, deployment/monitoring middle layer 226 removes the specification by first retrieving the path to the environment's code list repository from namespace-to-repository mapping 214 using the namespace that accompanied the request to remove the executable image. Deployment/monitoring middle layer 226 then searches the folder designated by the path for any specifications that match the application name and version provided in the removal request. If a matching specification is found, deployment/monitoring middle layer 226 removes the matching specification from the code list repository.

In accordance with other embodiments, a request to remove an executable image of an application from the memory of middle layer server 208 can be sent at step 116 and can be used at step 118 to remove a specification from an environment's code list repository 212 without steps 108, 110, 112, and 114 being performed. In other words, deployment orchestration 218 can request the removal of an application without requesting that a different application be loaded into memory first.

Figure 4:
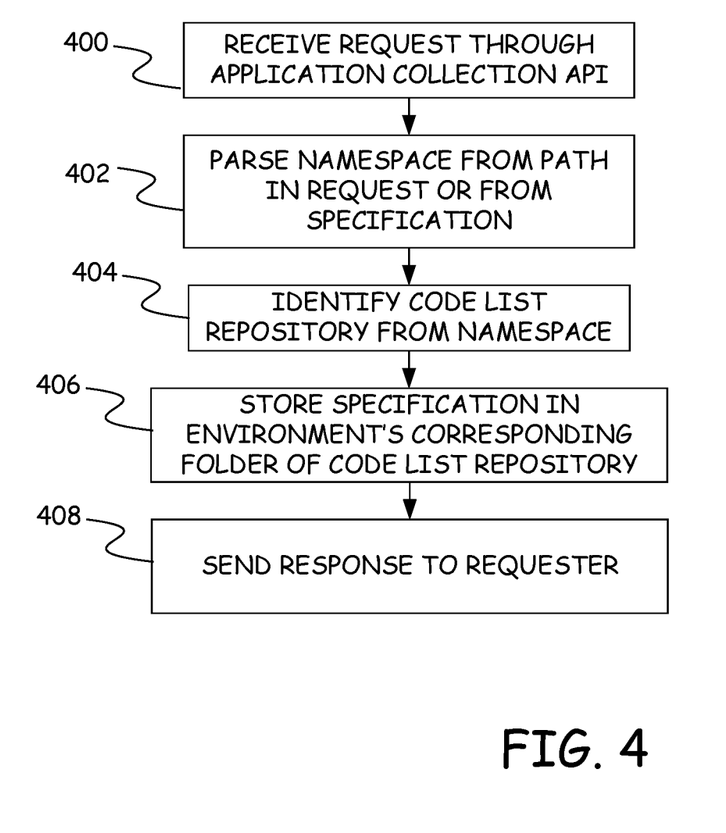
FIG. 4 is a flow diagram of a method for converting a deployment instruction into a change of a code list repository.
Figure 5:
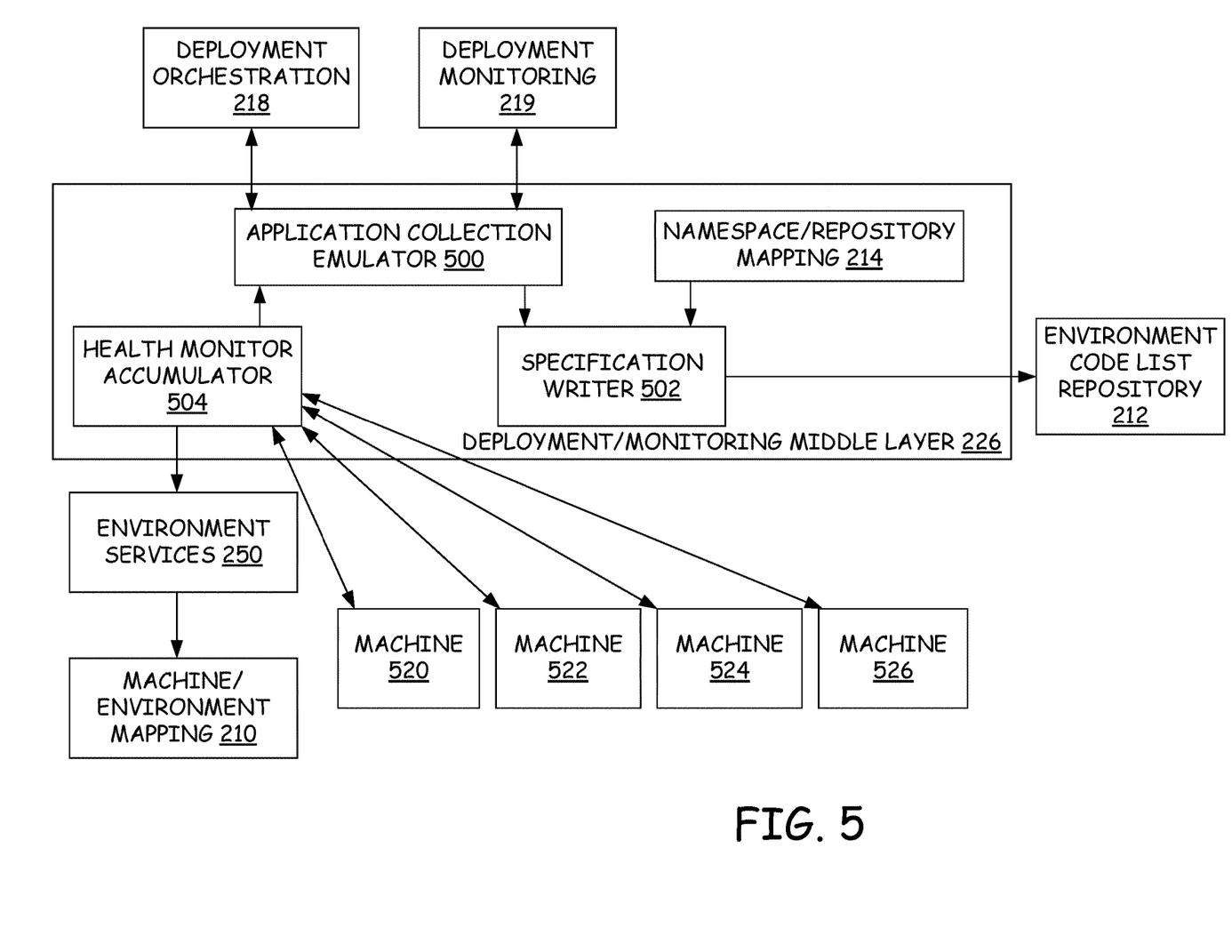
FIG. 5 is a more detailed block diagram of some elements of the system of FIG. 2.

FIG. 4 provides a flow diagram showing a method used by deployment/monitoring middle layer 226 to implement step 116 of FIG. 1 in accordance with one embodiment. FIG. 5 provides an expanded block diagram of portions of system 200 of FIG. 2 showing elements used in the method of FIG. 4.

In step 400 of FIG. 4, an application collection emulator 500 of deployment/monitoring middle layer 226 receives a request to load one or more instances of the executable image from deployment orchestration 218. In accordance with one embodiment, this request is made through an application collection API. In accordance with one particular embodiment, the application collection API is a Kubernetes API, which uses the RESTful API POST instruction together with a target path that includes a namespace for the environment and the ReplicaSet folder name. In addition, the message body of the POST instruction includes the specification for a Kubernetes ReplicaSet.

At step 402, application collection emulator 500 parses the path in the POST instruction to verify that it is a properly formatted POST instruction and to acquire the namespace if the namespace is provided in the path. If the namespace is not provided in the path, application collection emulator 500 parses the namespace from the specification provided in the message body.

At step 404, application collection emulator 500 provides the namespace to a definition writer 502, which uses the namespace to identify the path to the environment's code list repository using namespace/repository mapping 214. At step 406, definition writer 502 stores the specification in the environment's corresponding folder of the code list repository 212 using the identified path. If the specification is successfully stored, a response indicating the success of the POST operation is sent by application collection emulator 500 to deployment orchestration 218 at step 408. Similarly, if any errors occur when writing the specification to environment code list repository 212, an error response is sent to deployment orchestration 218 by application collection emulator 500.

Through the process of FIG. 4, deployment orchestration 218 interacts with deployment/monitoring middle layer 226 as if deployment/monitoring middle layer 226 is an application collection capable of loading an executable image for execution on middle layer server 208. However, instead of loading the application image directly on middle layer server 208, application collection emulator 500 and definition writer 502 cause the submitted specification to be written to environment code list repository 212 where it can be accessed by machines as discussed further below.

After multiple applications have been deployed as described in FIGS. 1 and 4, the code list repository for an environment contains a list of the applications that every machine assigned to a computing environment should have loaded in the machine's main memory/cpu caches. The list of applications consists of a group of application specifications (also referred to as definitions) that include an identifier for the application, the version of the application, the number of instances of the application that should be loaded into memory and the path to the executable image of the application. Each environment's list of applications in the code list repository is accessible by every machine that has been assigned to the environment.

Figure 6:
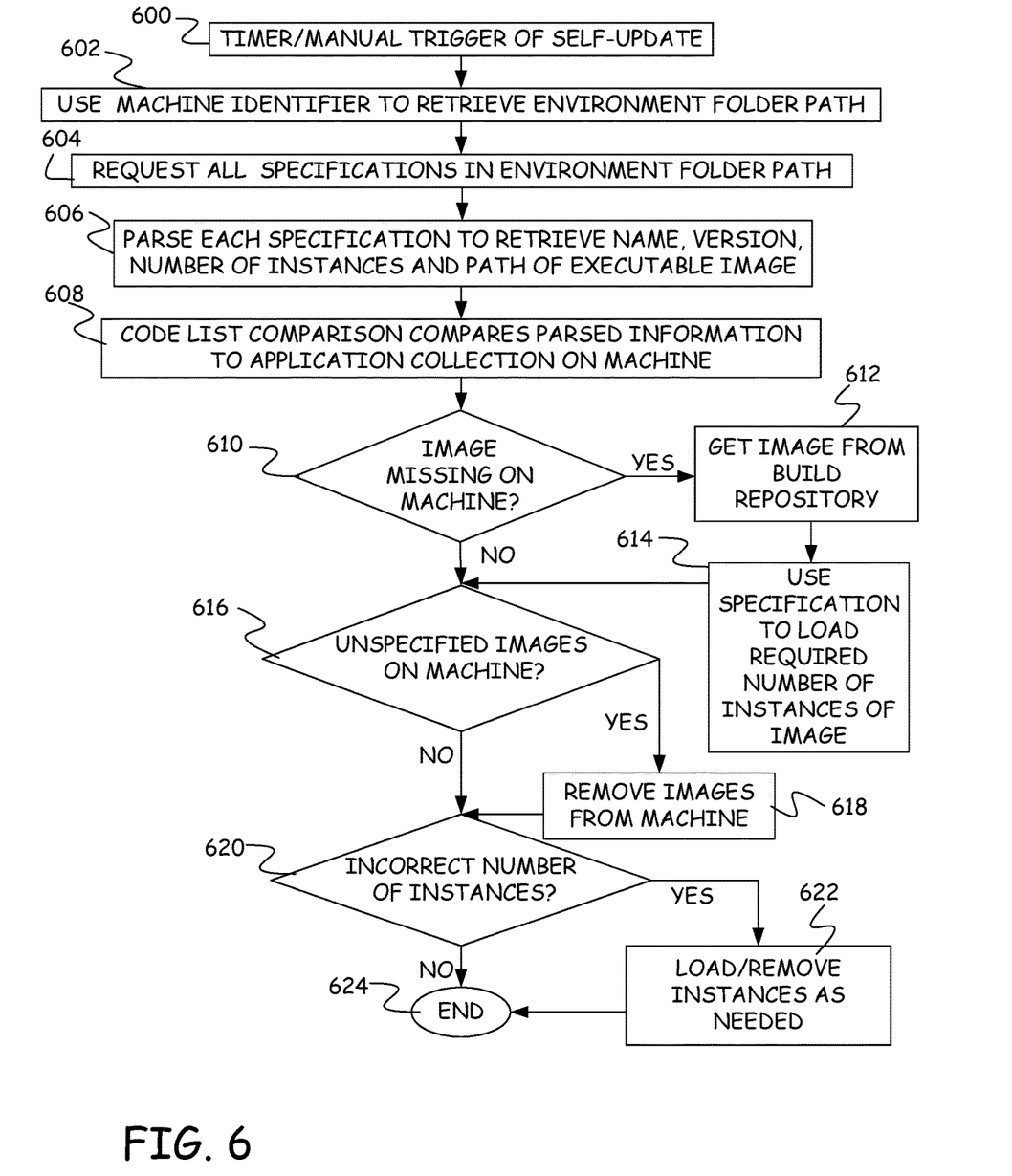
FIG. 6 is a flow diagram of a method used by a machine to update its coding environment.
Figure 7:
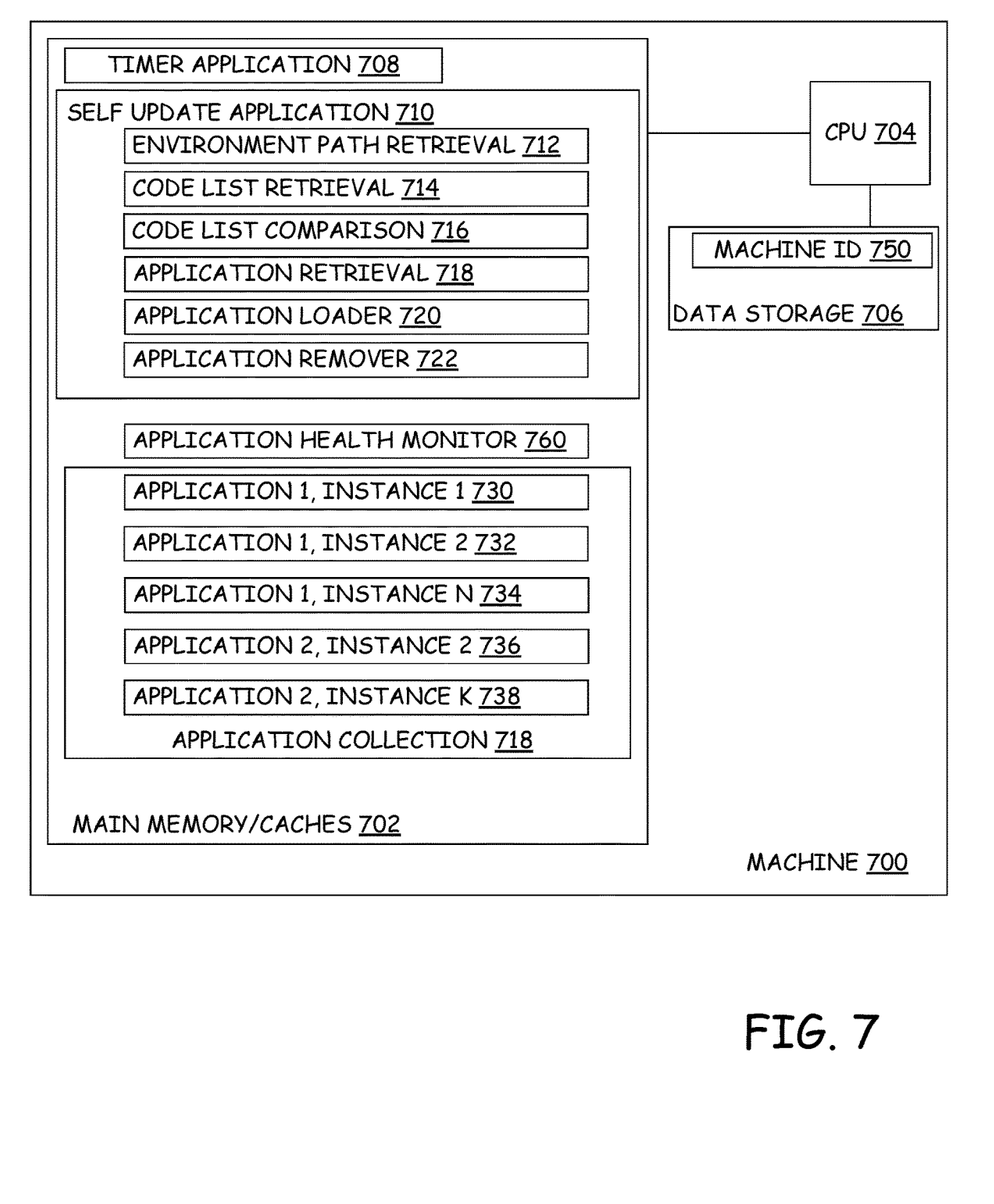
FIG. 7 is a block diagram of a machine.

FIG. 6 provides a flow diagram of a method used by a machine to synchronize/refresh/update the machine's programming environment so that the machine is running every instance of every application specified in the code list repository for the machine's environment and so that the machine is not running any instances of programs not listed in the code list repository for the machine's programming environment. FIG. 7 provides a block diagram of a machine 700 showing components used to perform the self-update. Machine 700 can include computing devices (such as servers, desktop computers, tablets, and laptops), mobile devices such as phones, and various equipment controllers including controllers embedded within single pieces of equipment and controllers that are external to and control multiple pieces of equipment. Machine 700 includes a main memory/caches 702, central processing unit (CPU) 704 and a data storage unit 706. Main memory/caches 702 consist of one or more types of random access memory that hold executable forms of applications that have processes that have been loaded into the running queue of CPU 704.

At step 600 of FIG. 6, a timer application 708 in main memory 702 is executed by CPU 704 and triggers the activation of a self-update application 710. Alternatively, self-update application 710 can be triggered manually at step 600. At step 602, an environment path retrieval module 712 in self-update application 710 retrieves a machine identifier 750 of the machine from data storage 706 and pass machine identifier 750 to environment services 250 of FIG. 2 to request the path to the code list repository 212 for machine 700's environment. Environment services 250 uses machine identifier 750 to retrieve the path from machine/environment mapping 210 and returns the environment folder path to environment path retrieval module 712. At step 604, a code list retrieval module 714 in self-update application 710 requests all specifications in the environment folder path of code list repository 212. At step 606, code list retrieval 714 receives the specifications and parses each specification to retrieve a name, version, number of instances and path to the executable image of each application in the code list repository 212 for the environment.

At step 608, a code list comparison module 716 compares the parsed information to applications that have been loaded in main memory/caches 702 as part of an application collection 711. Application collection 711 includes one or more applications and can include one or more instances of each application. For example, application collection 711 includes three instances 730, 732 and 734 of a first application and two instances 736 and 738 of a second application.

At step 610, if code list comparison 716 finds an executable image is missing from the machine that is listed in one of the specifications, application retrieval module 718 uses the path to the executable image to request the executable image from build repository 224 at step 612. At step 614, application loader 720 uses the specification for the missing executable image to identify the number of instances that are to be loaded into main memory/caches 702 and loads the required number of instances into main memory/caches 702 for execution. In accordance with one embodiment, each instance is loaded using a "run" or "execute" instruction.

Steps 612 and 614 are performed for each image that is missing on the machine as determined at step 610.

If no images are missing at step 610 or after all of the missing instances have been loaded into main memory 702 at step 614, code list comparison module 716 examines application collection 718 to determine if there are any image instances loaded in main memory 702 that are not present in the specifications retrieved from code list repository 212. If there are executable images in application collection 718 that are not listed in the specifications, those unspecified executable images are removed from the machine by an application remover 722 at step 618. Note that if multiple instances of an unspecified executable image are loaded into main memory 702, all of the instances are removed from main memory 702 at step 618.

If there are no unspecified executable images loaded in memory 702 or after all such unspecified executable images have been removed from the machine at step 618, self-update application 710 determines if the correct number of instances have been loaded into main memory 702 for each application. If an incorrect number of instances have been loaded, instances are loaded or removed as needed at step 622 so that the number of instances specified in the specifications from code list repository 212 is loaded in main memory 702. Thus, if a specification has been modified to change how many instances of an executable image that was already loaded in main memory 702 should be running, steps 620 and 622 will detect this change and modify the number of instances loaded in main memory to match the specified number of instances. If the correct number of instances is loaded for each application at step 620 or after instances have been loaded or removed as needed at step 622, the process of self-updating ends at step 624.

Figure 8:
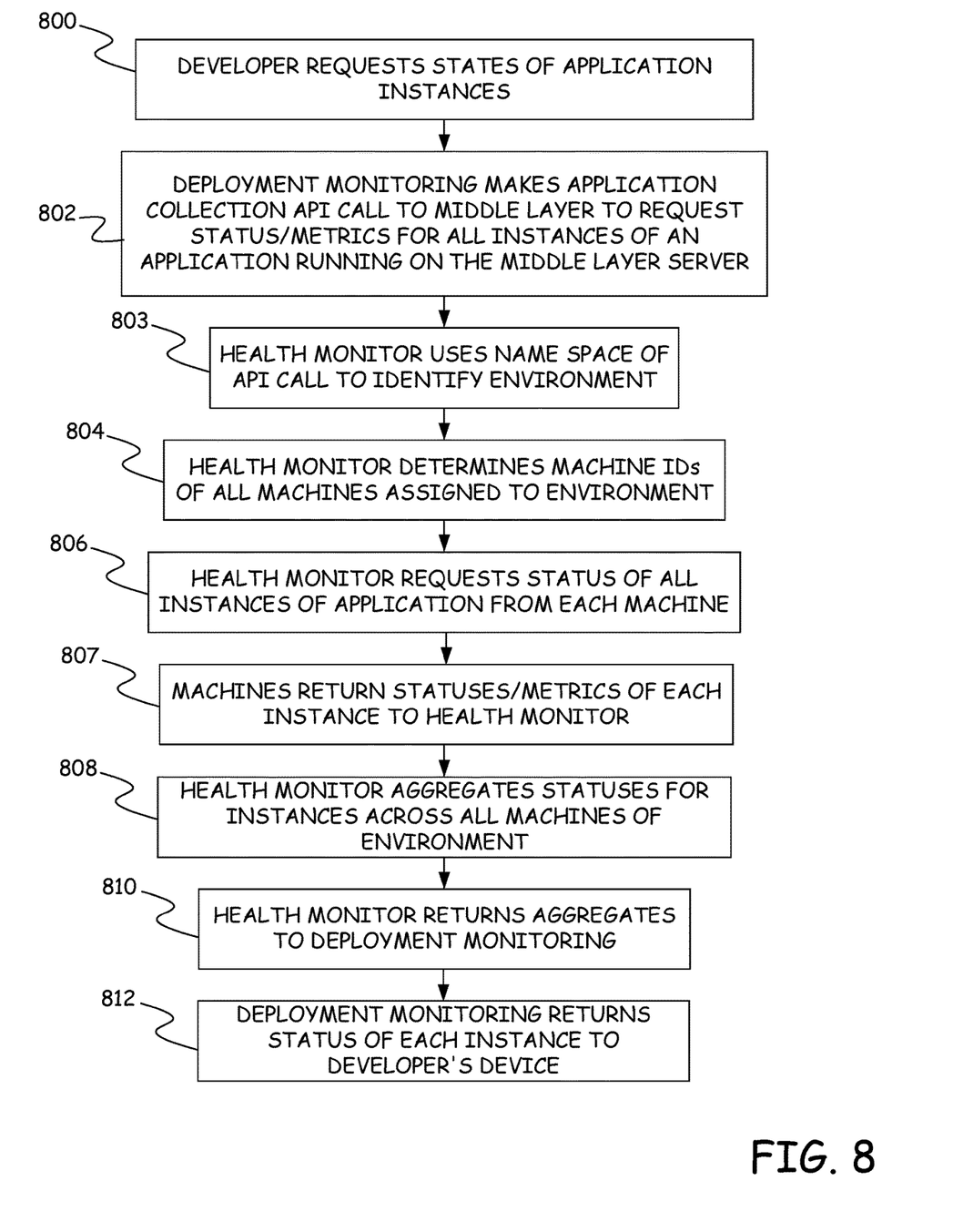
FIG. 8 is a flow diagram of a method of monitoring the health of application instances.

In accordance with further embodiments, code developers are able to monitor the status of instances of their applications running on the various machines assigned to the application's environments. FIG. 8 provides a flow diagram of a method for retrieving the statuses of such application instances in accordance with one embodiment.

In step 800, a developer uses their device 216 to make a request to deployment monitoring module 219 of deployment server 206 for the status or operational metrics of each instance of the application that is loaded into memory for execution. In accordance with one embodiment, the status or operational metrics describe some aspect of the current execution or lack of execution of an instance and are referred to generically as monitoring data. At step 802, deployment monitoring 219 makes an application collection API call to application collection emulator 500 on deployment monitoring middle layer 226. This application collection API call is a request for the status/metrics of each instance of the application loaded in memory on middle layer server 208. In accordance with one embodiment, this request takes the form of a RESTful GET request, requesting the status/metrics of each instance of the identified application. This GET request includes the namespace associated with the environment in which the application runs and an identifier for the application. At step 803, the application collection emulator 500 provides the namespace to a health monitor accumulator 504 of FIG. 5, which uses the namespace to identify the environment that the application has been assigned to. At step 804, health monitor accumulator 504 determines machine IDs of all machines assigned to the environment by making a request to environment services 250, which accesses machine/environment mapping 210 to return the machine IDs of every machine assigned to the identified environment. At step 806, health monitor accumulator 504 requests the status/metrics of all instances of the application from each machine identified in step 804. For example, in FIG. 5, health monitor accumulator 504 makes a status/metrics request to each of machines 520, 522, 524 and 526. At step 807, an application health monitor module (such as application health monitor module 700 of FIG. 7) in each machine obtains the status/metrics of each instance of the application loaded for execution on the machine and returns the status/metrics of each instance to health monitor accumulator 504, which receives and stores the status/metric values. At step 808, health monitor accumulator 504 aggregates the statuses/metrics for the instances across all machines assigned to the environment. In accordance with one embodiment, this aggregation makes it appear as if all of the instances were running on a single machine. Health monitor accumulator 504 then returns the aggregate statuses/metrics to application collection emulator 500, which then returns the statuses/metrics to deployment monitoring 219 at step 810. Deployment monitoring 219 then returns the status/metrics of each instance to developer's device 216 at step 812.

Because of deployment monitoring middle layer 226, deployment server 206 does not need to know which machines are executing instances of each application. In particular, from the perspective of deployment monitoring 219, the statuses returned by deployment middle layer 226 appear to be the statuses of instances running on middle layer server 208 instead of instances running on separate machines. Thus, by including the deployment monitoring middle layer 226, deployment monitoring 219 is decoupled from the assignment of machines to particular programming environments thereby simplifying the coding and operation of deployment monitoring 219.

Figure 9:
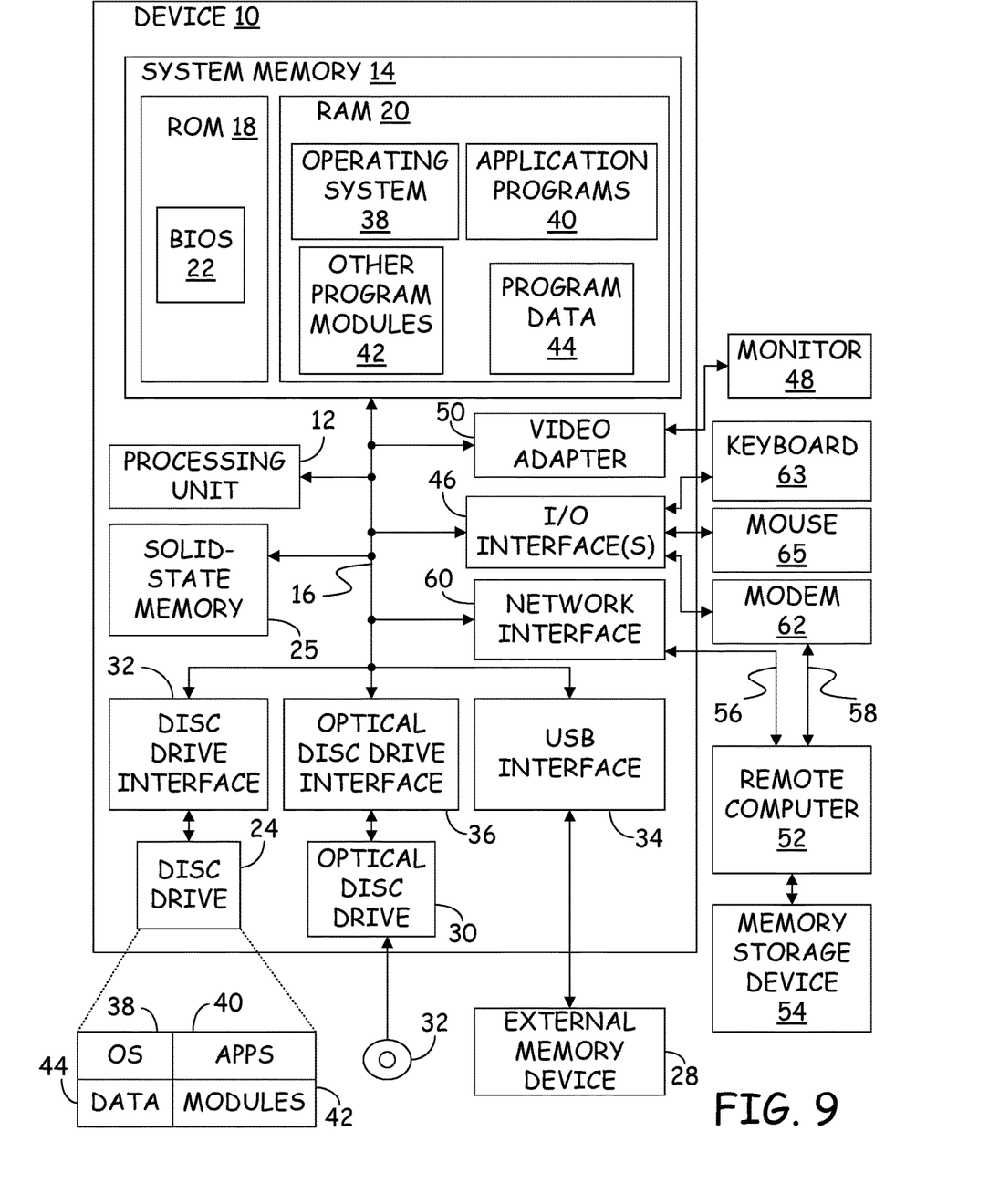
FIG. 9 is a block diagram of a computing environment used in accordance with the various embodiments.

FIG. 9 provides an example of a computing device 10 that can be used as server 122 in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 9. The network connections depicted in FIG. 9 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 9 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A machine comprising:
   a memory; and
   a processor performing steps comprising:
   receiving at the processor a request for a metric describing an execution of an application on the processor;
   sending from the processor a respective request for the metric to each of a plurality of computing machines;
   receiving at the processor responses from the plurality of computing machines; and
   using the responses to send from the processor a response to the request for the metric that was received at the processor.

2. The machine of claim 1 wherein sending a respective request for the metric to each of the plurality of computing machines comprises identifying a computing environment from the request, identifying computing machines assigned to the computing environment, and sending a separate request to each identified computing machine.

3. The machine of claim 1 wherein receiving responses from the plurality of computing machines comprises receiving a separate metric for each instance of the application loaded on the plurality of computing machines.

4. The machine of claim 3 wherein using the responses to send a response comprises aggregating the received metrics.

5. The machine of claim 3 wherein each computing machine in the plurality of computing machines receives a same specification that instructs the computing machine to load a same number of instances of the application as the other computing machines in the plurality of computing machines.

6. The machine of claim 5 wherein each computing machine in the plurality of computing machines receives the same specification by requesting the specification from a common repository assigned to the computing environment.

7. The machine of claim 1 wherein the response to the request for the metric sent from the processor makes it appear as if the application is being executed by the processor.

8. A computer-implemented method comprising:
   receiving a request at a computer for a metric associated with execution of an application;
   sending a respective request for the metric to each of a plurality of computing machines that are executing the application;
   receiving respective responses from each of the plurality of computing machines; and
   using the responses from the plurality of computing machines to create and send a response to request for the metric wherein the response makes it appear that the application is being executed by the computer instead of by the plurality of computing machines.

9. The computer-implemented method of claim 8 wherein sending a respective request for the metric to each of the plurality of computing machines comprises identifying a computing environment from the request, identifying computing machines assigned to the computing environment, and sending a separate request to each identified computing machine.

10. The computer-implemented method of claim 8 wherein receiving respective responses from the plurality of computing machines comprises receiving a separate metric for each instance of the application loaded on the plurality of computing machines.

11. The computer-implemented method of claim 10 wherein using the responses to send a response comprises aggregating the received metrics.

12. The computer-implemented method of claim 10 wherein each computing machine in the plurality of computing machines receives a same specification that instructs the computing machine to load a same number of instances of the application as the other computing machines in the plurality of computing machines.

13. The computer-implemented method of claim 12 wherein each computing machine in the plurality of computing machines receives the same specification by requesting the specification from a common repository assigned to the computing environment.

14. The computer-implemented method of claim 8 wherein the computer is not executing the application.

15. A computer-implemented method comprising:
receiving at a computer a request for a metric describing an execution of an application on the computer;
sending from the computer a respective request for the metric to each of a plurality of computing machines;
receiving at the computer responses from the plurality of computing machines; and
using the responses to send from the computer a response to the request for the metric that was received at the computer.

16. The computer-implemented method of claim 15 wherein sending a respective request for the metric to each of a plurality of computing machines comprises identifying a computing environment from the request, identifying computing machines assigned to the computing environment, and sending a separate request to each identified computing machine.

17. The computer-implemented method of claim 15 wherein receiving responses from the plurality of computing machines comprises receiving a separate metric for each instance of the application loaded on the plurality of computing machines.

18. The computer-implemented method of claim 17 wherein using the responses to send a response comprises aggregating the received metrics.

19. The computer-implemented method of claim 17 wherein each computing machine in the plurality of computing machines receives a same specification that instructs the computing machine to load a same number of instances of the application as the other computing machines in the plurality of computing machines.

20. The computer-implemented method of claim 19 wherein each computing machine in the plurality of computing machines receives the same specification by requesting the specification from a common repository assigned to the computing environment.

* * * * *